(12) United States Patent
Cortequisse et al.

(10) Patent No.: US 10,082,038 B2
(45) Date of Patent: Sep. 25, 2018

(54) AXIAL TURBOMACHINE COMPRESSOR OUTER CASING WITH SEAL

(71) Applicant: Techspace Aero S.A., Herstal (Milmort) (BE)

(72) Inventors: Jean-Francois Cortequisse, Heers (BE); Philippe Minot, Woluwe Saint-Pierre (BE)

(73) Assignee: Safran Aero Boosters S.A. (BE)

( * ) Notice: Subject to any disclaimer, the term of this patent is extended or adjusted under 35 U.S.C. 154(b) by 440 days.

(21) Appl. No.: 14/853,033

(22) Filed: Sep. 14, 2015

(65) Prior Publication Data
US 2016/0102571 A1   Apr. 14, 2016

(30) Foreign Application Priority Data
Oct. 10, 2014  (BE) .................................. 2014/0742

(51) Int. Cl.
*F01D 11/22* (2006.01)
*F01D 11/02* (2006.01)
*F01D 1/20* (2006.01)
*F01D 25/24* (2006.01)

(52) U.S. Cl.
CPC .............. *F01D 11/025* (2013.01); *F01D 1/20* (2013.01); *F01D 11/22* (2013.01); *F01D 25/24* (2013.01); *F05D 2260/407* (2013.01); *Y02T 50/672* (2013.01)

(58) Field of Classification Search
CPC .......... F01D 11/025; F01D 1/20; F01D 11/22; F01D 25/24; F05D 2260/407
See application file for complete search history.

(56) References Cited

U.S. PATENT DOCUMENTS

| | | | | | |
|---|---|---|---|---|---|
| 5,545,007 | A | * | 8/1996 | Martin | F01D 11/22 415/118 |
| 6,547,522 | B2 | * | 4/2003 | Turnquist | F01D 11/122 415/173.3 |
| 8,894,358 | B2 | * | 11/2014 | Bacic | F01D 11/20 415/126 |

(Continued)

FOREIGN PATENT DOCUMENTS

| EP | 1467066 A2 | 10/2004 |
|---|---|---|
| EP | 2495399 A1 | 9/2012 |

(Continued)

OTHER PUBLICATIONS

European Search Report from corresponding Belgium Application No. BE 201400742, dated Jun. 2, 2015.

*Primary Examiner* — Aaron R Eastman
(74) *Attorney, Agent, or Firm* — Sandberg Phoenix & von Gontard PC.

(57) ABSTRACT

The invention relates to an axial turbomachine compressor outer casing. The casing comprises a sealing device collaborating with a row of rotor blades. The casing comprises a wall with an annular groove in which the sealing device is housed. The sealing device comprises a segmented outer shroud and a plurality of piezoelectric actuators moving the shroud radially in the groove so as to open or close the functional clearance. The invention also proposes a method for controlling a sealing device for a turbojet engine, the method comprising a step of measuring the altitude and a step of adjusting a clearance according to the altitude.

20 Claims, 2 Drawing Sheets

(56) References Cited

U.S. PATENT DOCUMENTS

| | | | | |
|---|---|---|---|---|
| 2004/0120809 A1* | 6/2004 | Loftus | ............... | F01D 11/22 415/173.2 |
| 2008/0267770 A1* | 10/2008 | Webster | ............... | F01D 11/005 415/173.1 |
| 2014/0150262 A1* | 6/2014 | Le Borgne | ............... | B29C 70/088 29/889.3 |

FOREIGN PATENT DOCUMENTS

| | | |
|---|---|---|
| SU | 1749494 | 7/1992 |
| WO | 2010112421 | 10/2010 |

* cited by examiner

AXIAL TURBOMACHINE COMPRESSOR OUTER CASING WITH SEAL

CROSS-REFERENCE TO RELATED APPLICATIONS

This application claims the benefit, under 35 U.S.C. § 119, of BE 2014/0742 filed Oct. 10, 2014, the disclosure of which is incorporated herein by reference in its entirety.

FIELD

The invention relates to an axial turbomachine outer casing with sealing device. More specifically, the invention relates to an axial turbomachine compressor outer casing equipped with a sealing device around a row of rotor blades. The invention also relates to an axial turbomachine. The invention also relates to a method of controlling an axial turbomachine sealing device.

BACKGROUND

With a view to increasing efficiency, a turbomachine is provided with a sealing device around its rows of blades. These devices allow the clearance between an inner surface of a casing and the outer ends of the rotor blades arranged inside the inner casing to be adapted. Thus, under operating conditions, the clearance can be reduced so as to limit dynamic leaks between the surface and the blades.

Such a device can comprise an outer casing acting as a support to an outer shroud which is connected to it by means of deformable elements. In the event of a change in flight conditions, rotor blades can come into contact with the shroud and move it radially. The movement is permitted by the deformable elements, the amplitude of compression of which allows the position of the shroud to be adjusted.

Document EP 2 495 399 A1 discloses an axial turbomachine outer casing comprising an annular wall in which an inner annular groove is formed. The annular groove houses elastic elements that connect a segmented outer shroud to the bottom of the groove, and therefore to the annular wall. When the rotor of the turbomachine becomes misaligned with respect to its axis of rotation, the rotor blades come into contact with the shroud and push on it. Such a sealing device therefore can adapt to various flight conditions and improves operational safety. However, the gain in efficiency that such a device offers remains limited, as too does the number of configurations to which it can adapt.

SUMMARY

An objective of the invention is to solve at least one of the problems posed by the prior art. More specifically, it is an objective of the invention to increase the efficiency of an axial turbomachine fitted with a sealing device. Another objective of the invention is to increase the number of configurations to which a sealing device is able to adapt.

One subject of the invention is an outer casing of an axial turbomachine, notably of an axial turbomachine compressor, the casing comprising: a circular wall comprising an inner annular groove; an outer sealing shroud arranged at least partially in the groove and intended to provide sealing between the outer casing and an annular row of rotor blades of the turbomachine, connecting elements connecting the outer shroud to the wall; notable in that the connecting elements are piezoelectric actuators configured to move and/or deform the shroud so as to alter the clearance between the shroud and the rotor blades.

According to various embodiments of the invention, the piezoelectric actuators are monobloc and arranged in such a way as to deform radially so as to move and/or deform the shroud radially.

According to various embodiments of the invention, the casing comprises at least one electric connection which is connected to the piezoelectric actuators and which passes through the wall; in various implementations the electrical connection passes radially through the wall, axially in the region of the annular groove.

According to various embodiments of the invention, at least one or each electrical connection comprises an electric wire, the wall comprising seals around each electrical connection.

According to various embodiments of the invention, the casing comprises circular seals upstream and downstream of the outer shroud and collaborating with the wall.

According to various embodiments of the invention, the casing comprises a clearance measurement module configured to measure the clearance between the outer shroud and the rotor blades, the module being arranged axially in the region of the annular groove; in various implementations the module is arranged in the groove.

According to various embodiments of the invention, the casing comprises a power supply configured to power each piezoelectric actuator individually.

According to various embodiments of the invention, the groove comprises an upstream annular surface and a downstream annular surface of which the profiles of revolution extend mainly radially, the piezoelectric actuators being arranged axially between the said radial annular surfaces; for preference each piezoelectric actuator is positioned some distance away from each radial annular surface.

According to various embodiments of the invention, the wall comprises an electrically insulating layer, in various instances in contact with the piezoelectric actuators.

According to various embodiments of the invention, the wall comprises annular portions axially extending the annular groove upstream and downstream, the groove and the annular portions being formed as one.

According to various embodiments of the invention, the wall comprises an inner overall surface with a profile of revolution about the axis of rotation of the turbomachine, and the outer shroud comprises an inner annular surface, the inner annular surface of the shroud being able to move between a position radially inside the inner general surface of the wall and a position radially outside the inner general surface of the wall.

According to various embodiments of the invention, the casing comprises a determination module for determining altitude, the piezoelectric actuators being configured to be driven according to the altitude determined by the determination module.

According to various embodiments of the invention, the piezoelectric actuators are arranged in annular rows and/or in axial lines so as to form a grid.

According to various embodiments of the invention, the shroud is segmented, in various instances the shroud is made of metal and forms a strip; or the shroud is formed as one and comprises an annular surface.

According to various embodiments of the invention, the casing is a composite casing with an organic matrix, possibly the casing is formed of half-shells.

According to various embodiments of the invention, the shroud comprises a support and a circular or semicircular layer of an abradable material.

According to various embodiments of the invention, the axial length of the rotor blades is greater than the axial length of the groove.

According to various embodiments of the invention, the shroud is arranged axially and/or radially in the annular groove.

According to various embodiments of the invention, the shroud surrounds the annular row of rotor blades.

According to various embodiments of the invention, the annular groove is axially longer than it is radially deep.

According to various embodiments of the invention, the wall has a thickness that is constant axially along the entire length of the axial portions and of the annular groove.

Another subject of the invention is a turbomachine comprising an outer casing surrounding at least one annular row of rotor blades, notable in that the casing is in accordance with the invention, for preference the casing is a compressor casing, in various instances a casing of a low-pressure compressor.

According to various embodiments of the invention, the turbomachine comprises a vibration sensor sensing radial vibrations of the rotor blades, the piezoelectric actuators being configured in such a way as to move and/or deform the outer shroud radially according to the radial vibrations of the blades which are measured by the vibration sensors.

The invention also relates to a method for controlling a device for sealing the outer casing of an axial turbomachine, the device comprising a mobile outer shroud defining a radial clearance around an annular row of rotor blades of the turbomachine, wherein the method involves (a) a step of determining the altitude of the turbomachine, followed by (d) a step of adjusting the clearance according to the altitude.

According to various embodiments of the invention, the clearance decreases as the altitude increases and/or the clearance increases as the altitude decreases.

According to various embodiments of the invention, the clearance is equal to a clearance J1 when the altitude exceeds a threshold altitude A2, and/or the clearance is greater than or equal to a clearance J2 when the altitude is less than or equal to a threshold altitude A2.

According to various embodiments of the invention, the method further comprises a step (c) of measuring the clearance between the outer shroud and the rotor blades, and during the step (d) of adjusting the clearance, the clearance is initially adjusted according to the clearance measured during the step (c) of measuring the clearance.

According to various embodiments of the invention, the method further comprises a step (b) of measuring the amplitude of the radial vibrations of the rotor blades, and during the step (d) of adjusting the clearance, the clearance is likewise adjusted according to the radial vibrations of the blades as measured during the step (b) of measuring the amplitude of the vibrations.

The altitude is measured with respect to sea level.

The invention makes it possible to control as closely as possible the clearance between the shroud and the radially outer ends of the blades. The use of piezoelectric actuators offers speed of response, and a great deal of positional accuracy. In that way, the position of the shroud is regulated as accurately as possible while at the same time moving it rapidly, making it possible effectively to control the clearance between the shroud and the blades.

The shape of the groove allows the addition of radial reinforcing flanges making it possible to render the casing radially more rigid, for example to counter ovalization deformations. The groove also forms a space that protects the piezoelectric actuators.

The method improves safety because the use of altitude means that it becomes possible to anticipate the conditions of operation of the turbomachine when this is an aircraft turbojet or turboprop engine. The safety clearance is increased as a function of the risk of a probability of being exposed to random disturbances.

DRAWINGS

FIG. 1 depicts an axial turbomachine according to various embodiments of the invention.

FIG. 2 sketches a turbomachine compressor according to various embodiments of the invention.

DESCRIPTION

In the description which will follow, the terms interior or inner and exterior or outer refer to a position with respect to the axis of rotation of an axial turbomachine.

Figure 1:
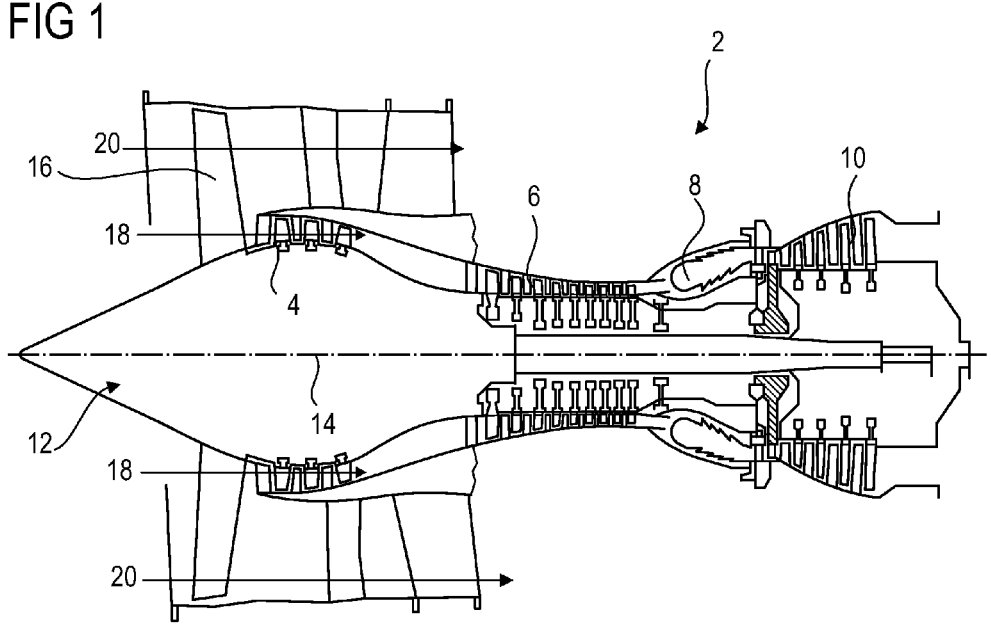

FIG. 1 is a simplified depiction of an axial turbomachine. In this particular case it is a bypass turbojet engine 2. The turbojet engine 2 comprises a first compression level referred to as a low-pressure compressor 4, a second compression level referred to as a high-pressure compressor 6, a combustion chamber 8 and one or more turbine levels 10. In operation, the mechanical power of the turbine 10, transmitted via the central shaft to the rotor 12, turns the two compressors 4 and 6. The latter comprise several rows of rotor blades associated with rows of stator blades. Rotation of the rotor about its axis of rotation 14 thus generates a flow of air and progressively compresses this flow until it enters the combustion chamber 8.

An inlet blower commonly referred to as a fan 16 is coupled to the rotor 12 and generates a flow of air which is split into a primary flow 18 passing through the various aforementioned levels of the turbomachine, and a secondary or bypass flow 20 that passes along an annular duct (depicted in part) along the machine until it recombines with the primary flow as it leaves the turbine. The secondary flow can be accelerated in order to generate reactive thrust. The primary flow 18 and secondary or bypass flow 20 are annular flows and are ducted by the casing of the turbomachine. To do that, the casing has cylindrical walls or shrouds which can be inner or outer.

Figure 2:
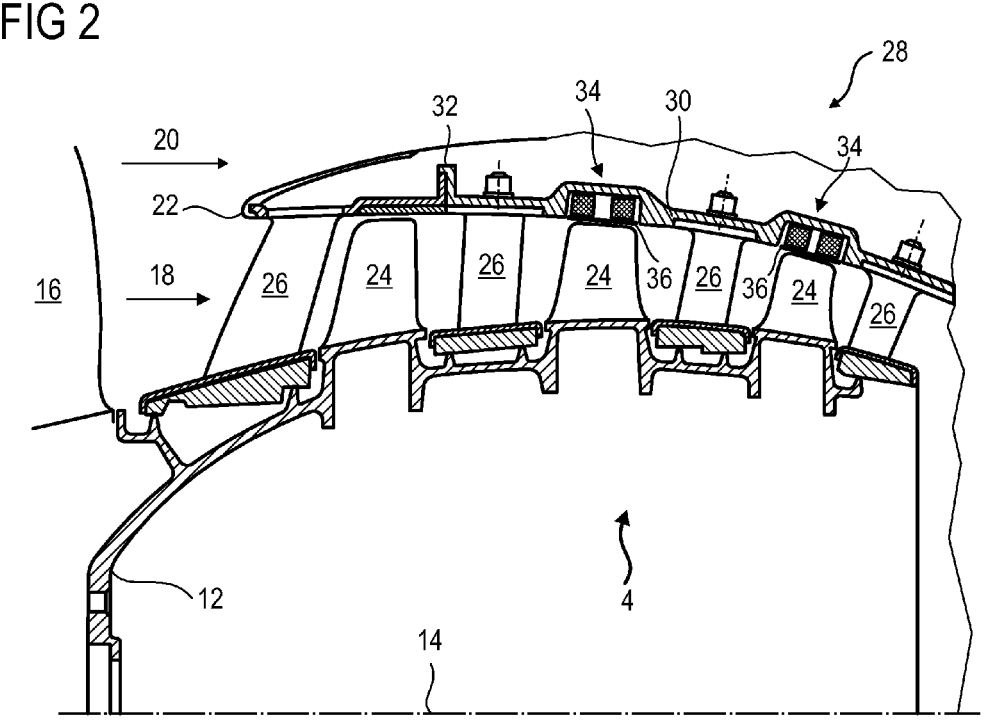

FIG. 2 is a view in cross section of a compressor of an axial turbomachine such as the one of FIG. 1. The compressor can be a low-pressure compressor 4. Here can be seen part of the fan 16 and of the lip 22 that separates the primary flow 18 from the secondary or bypass flow 20. The rotor 12 comprises several rows of rotor blades 24, in this instance three rows.

The low-pressure compressor 4 comprises several sets of guide vanes, in this instance four sets, each containing a row of stator blades 26. The sets of guide vanes are associated with the fan 16 or with a row of rotor blades in order to straighten the air flow so as to convert the speed of the flow into pressure.

The compressor comprises an outer casing 28 with a circular or annular wall 30 acting as a mechanical connection connecting the dividing lip to the intermediate casing of the turbomachine. In addition to that, the casing 28 can have fixing means, such as annular fixing flanges 32. The wall 30 also acts as a support for the mounting of stator blades 26 that extend essentially radially from the wall 30. The wall 30 can have annular shoulders forming end stops that axially immobilize the platforms of the stator blades 26. The wall 30 can be generally tubular and can possibly have an arched profile of revolution.

The wall 30 can be made from a composite material, for example an organic resin and carbon fibre and/or possibly a ply of fibre glass. The composite material improves the strength/weight ratio. The presence of glass fibre has the effect of creating an insulating layer. The wall 30 can have a thickness that is generally constant in order to maintain its lightness of weight, its compactness, and simplify the creation of a corresponding fibrous preform.

In order to optimize the efficiency, the casing 28 is fitted with at least one sealing device 34 associated with an annular row of rotor blades 24. Each sealing device 34 comprises an outer shroud 36 that is able to move radially so as to follow the radial movements of the outer ends of the rotor blades 24. The device 34 is incorporated into the thickness of the wall 30 to improve compactness.

Figure 3:
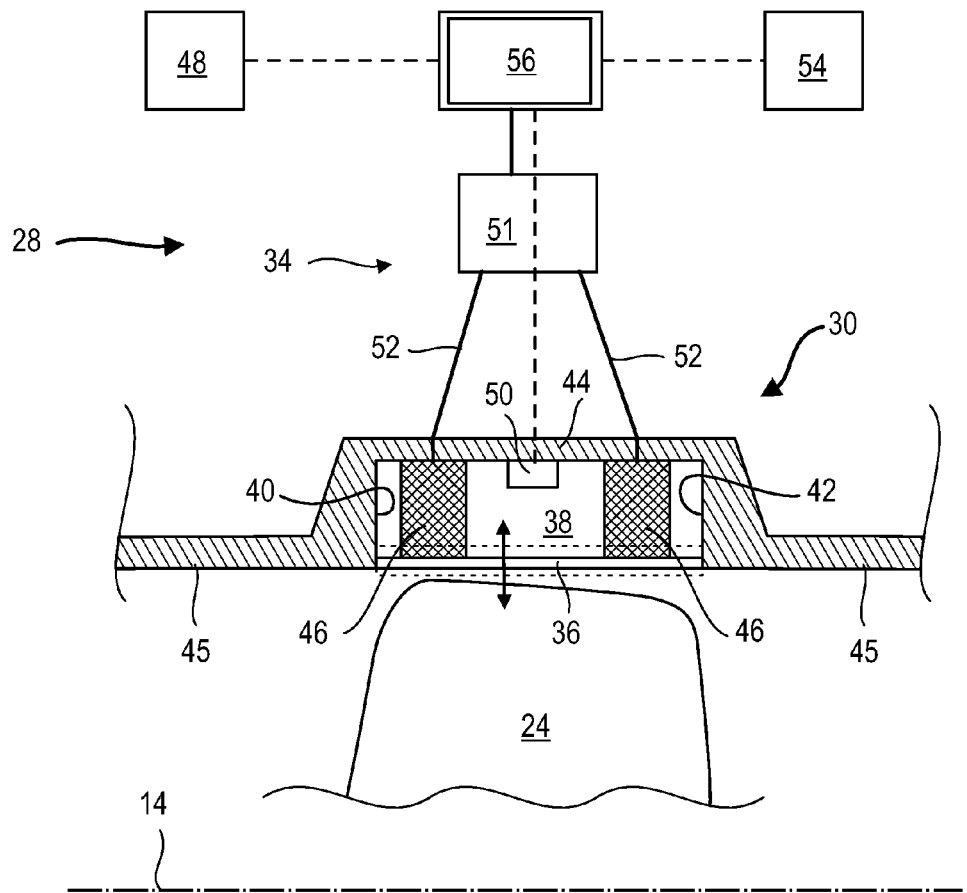
FIG. 3 illustrates a sealing device for a turbomachine casing according to various embodiments of the invention.

FIG. 3 sketches a sealing device 34 according to the invention. A portion of the wall 30 of the casing 28, an end of a rotor blade 24 and the axis of rotation 14 are depicted.

The wall 30 has an annular groove 38 open radially towards the inside, its profile is open towards the blade 24. The groove 38 comprises an upstream annular surface 40 and a downstream annular surface 42 both of which extend mainly radially. These radial surfaces (40, 42) can be generally parallel. The groove 38 further comprises an annular joining portion 44 which axially separates the radially surfaces (40, 42). The wall comprises annular lateral portions 45 axially extending the annular groove upstream and downstream and doing so on the circumference of the groove. The groove and the lateral portions 45 can be formed as one so as to form a fluid tight and homogenous block of material.

The sealing device 34 is housed in the annular groove 38. Its outer shroud 36 has a surface facing the outer ends of the blades 24. The shroud 36 can be arranged circularly in the groove 38 and can be segmented or can be as a single piece. In the latter instance, the shroud can deform so that its diameter and its circumference are modifiable. The outer shroud 36 can slide along, e.g., against, the radial surfaces (40, 42) so as to encourage the sealing of the blade from upstream to downstream. Thus, the shroud can delimit the inner annular space of the groove 38 and limit heating. The casing can comprise circular seals positioned upstream and downstream of the shroud in order to seal against the wall, it being possible for the seals to be at fixed interfaces.

The sealing device 34 comprises connecting elements 46 which join the outer shroud 36, in various instances each shroud segment, to the wall 30. They articulate the shroud 36 with respect to the wall 30. The elements 46 are at least partially, and in various implementations wholly, housed in the annular groove 38.

The connecting elements 46 are piezoelectric actuators 46. Piezoelectric actuators 46 are well known to those skilled in the art and can deform under the effect of a field, an electric power supply. They each have one face fixed to the wall 30, in the bottom of the groove 38 formed by the annular joining portion 44, and one face fixed to the outer shroud 36. They are arranged in such a way as to be able to deform radially, which means to say to become radially thicker or thinner so as to move or deform the outer shroud 36 radially. Thus, the shroud 36 can be retracted into the groove 38 radially towards the outside, and/or deployed out of the groove 38 towards the inside. A rest position, for example occupied when no power is applied, can be chosen so as to minimize the clearance, thereby increasing the overall efficiency of the turbomachine. The actuators 46 can be formed as one with a multilayer structure.

Because the shroud 36 thermally protects the piezoelectric actuators 46, the latter maintain their performance. Around the groove 38, the wall 30 can also contribute to regulating the temperature of the piezoelectric actuators 46. The wall 30 can form a fluid tight barrier which protects the piezoelectric actuators 46 from the chemical attacks intrinsic to a turbomachine.

The casing can comprise a determination module 48 for determining the altitude, and/or a clearance measurement module 50 for measuring the clearance between the outer shroud 36 and the outer ends of the rotor blades 24. The information, the signal supplied by the altitude determination module 48 and/or by the clearance measurement module 50 are used to adjust the annular radial clearance between the blade and the shroud. The altitude determination module 48 can be common to that of the turbomachine; it can be that of an aircraft on which the turbomachine is mounted. The clearance measurement module 50 for measuring the clearance between the shroud 36 and the blades 24, which measures continuously, at various points on the circumference of the shroud, measures the clearance between the blades and the shroud.

The casing can comprise a power supply 51 and electrical connections 52 such as electric wires and/or electric plugs for powering each piezoelectric actuator 46. Each wire can be insulated by an insulating sheath. The electrical connectors 52 pass through the wall 30 and enter the groove 38. They are connected to each piezoelectric actuator 46, possibly individually. The power supply can be that of the turbomachine.

The casing can comprise a vibrations sensor 54 sensing radial vibrations of the rotor blades. The sensor 54 can measure the amplitude of the radial vibrations of the blade tips. This sensor 54 makes it possible to estimate the variation, dispersion and radial position of the blades 24 and adapt the necessary safety margin accordingly. The vibrations sensor 54 and/or the clearance measurement module 50 can be optical or magnetic. They can comprise components in common, and/or components placed in the groove 38.

The casing 28 can comprise a central unit 56 connected to the measurement module, to the altitude determination module, to the vibrations sensor, to the actuators, via the power supply. The central unit 56 can be a computer connected to the turbomachine or specific to the aircraft in which the turbomachine is mounted.

Figure 4:
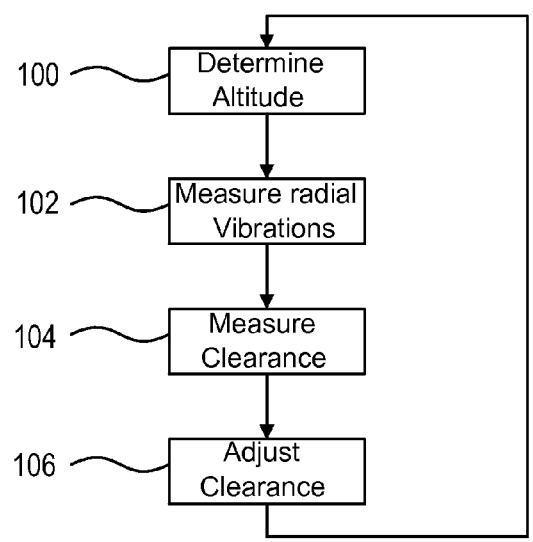
FIG. 4 is a diagram of a method for adjusting the clearance between the rotor blades and an outer shroud of a turbomachine casing according to various embodiments of the invention.

FIG. 4 is a block diagram of a method for controlling a sealing device according to the invention. The device radially controls the position and/or deformation of an outer sealing shroud around a stage of rotor blades, the shroud and the blades being separated by an annular clearance. As an option, the method is iterative and involves looping back to repeat the steps described hereinabove.

The method can involve stringing together the following steps, in various embodiments the steps can be in the order given below, while in other embodiments the steps can be in any other desired order:

(a) a step 100 of determining the altitude of the turbomachine, (b) a step 102 of measuring the radial vibrations of the rotor blades, (c) a step 104 of measuring the clearance between the rotor blades and the outer shroud, (d) a step 106 of adjusting the clearance by moving and/or deforming the outer shroud radially.

During the step (d) of adjusting 106, alterations to the clearance are performed according to the altitude determined during the determination step (a). The more the altitude increases, the more the clearance decreases. This choice can be understood when it is considered that, at high altitude, for example above a threshold altitude A2, the causes likely to disrupt the rotor and cause it to shift, or to deform the casing are somewhat improbable. Thus, the risk of contact between a blade and the shroud is very limited, or even nonexistent because the causes become predictable. The threshold A2 can be chosen to be greater than or equal to 4000 m, e.g., greater than or equal to 8000 m, and the threshold A2 can be greater than or equal to 10 000 m. In these flying conditions, the clearance is less than a clearance J1, and the sealing and efficiency of the turbomachine become optical.

Conversely, it can be decided, that, at low altitude, the clearance needs to be increased because the turbomachine is exposed to variable and difficult-to-predict operating conditions. Thus, in various instances, below a threshold altitude A1, the clearance can become greater than a clearance J2, or safety clearance. The threshold A2 can be less than 6000 m, e.g., less than 2000 m, e.g., less than 500 m.

During the step (d) of adjusting 106, the alteration of the clearance can also be performed as a function of the clearance previously measured during the step (b) of measuring the vibrations 102 and/or according to the vibrations estimated during the step (c) of measuring the clearance 104. The vibrations cause spread on the position of the blades and this impinges on the required operational safety. It should be noted that steps (b) and (c) are optional. Step (c) is optional because the step (d) of adjustment 106 can be carried out on the basis of a programmed value or a basic theoretical value.

What is claimed is:

1. An outer casing of an axial turbomachine, the outer casing comprising:
   a circular wall comprising an inner annular groove with an annular bottom;
   an outer sealing shroud arranged at least partially in the inner annular groove and structured and operable to provide sealing between the outer casing and an annular row of blades of the turbomachine;
   at least one piezoelectric actuator connecting the outer sealing shroud to the annular bottom of the circular wall and structured and operable to move the outer sealing shroud in order to alter a clearance between the outer sealing shroud and the rotor blades,
   the outer sealing shroud comprising an inner annular surface and an outer annular surface radially opposed to the inner annular surface and in contact with the piezoelectric actuators,
   the at least one piezoelectric actuator forming two axially distant annular rows of piezoelectric actuators arranged in the inner annular groove.

2. The outer casing in accordance with claim 1, wherein each piezoelectric actuator forms a one-piece body and is arranged in such a way as to deform radially so as to move the outer sealing shroud radially.

3. The outer casing in accordance with claim 1 further comprising at least one electric connection that is connected to the piezoelectric actuators and which passes through the circular wall; the electrical connection passing radially through the annular bottom of the inner annular groove.

4. The outer casing in accordance with claim 3, wherein at least one or each electrical connection comprises an electric wire, the circular wall comprising seals around each electrical connection.

5. The outer casing in accordance with claim 1 further comprising circular seals upstream and downstream of the outer sealing shroud and acting with the circular wall.

6. The outer casing in accordance with claim 1 further comprising a clearance measurement module structured and operable to measure the radial clearance between the outer sealing shroud and the rotor blades, the clearance measurement module being arranged in the inner annular groove.

7. The outer casing in accordance with claim 1, wherein the inner annular groove comprises an upstream annular surface and a downstream annular surface of which the profiles of revolution extend radially, the piezoelectric actuators being arranged axially between the radial annular surfaces, each piezoelectric actuator positioned away from each radial annular surface.

8. The outer casing in accordance with claim 1, wherein the circular wall comprises an electrically and thermally insulating layer in contact with the piezoelectric actuators.

9. The outer casing in accordance with claim 1, wherein the circular wall comprises annular portions axially extending the inner annular groove upstream and downstream, the inner annular groove and the annular portions being integrally formed.

10. The outer casing in accordance with claim 1, wherein the circular wall comprises an inner general surface with a profile of revolution about the axis of rotation of the turbomachine, and the outer sealing shroud comprises an inner annular surface, the inner annular surface of the outer sealing shroud being able to move between a position radially inside the inner general surface of the circular wall and a position radially outside the inner general surface of the circular wall.

11. The outer casing in accordance with claim 1 further comprising an altitude determination module, the piezoelectric actuators being configured to be driven according to an altitude determined by the altitude determination module.

12. The outer casing in accordance with claim 1, wherein it is a composite casing with an organic matrix and fibers.

13. A turbomachine comprising a rotor with an annular blade row, and an outer casing encircling said annular blade row, said outer casing comprising:
   a circular wall comprising an inner annular groove;
   an outer sealing shroud arranged at least partially in the inner annular groove and structured and operable to provide sealing between the outer casing and an annular row of rotor blades of the turbomachine:
   at least one piezoelectric actuator radially between the outer sealing shroud and the circular wall and structured and operable to connect them and to alter the radial clearance between the outer sealing shroud and the rotor blades, and
   the inner annular groove including a clearance measurement module which is axially distant from the at least one piezoelectric actuator.

14. The turbomachine in accordance with claim 13 wherein the outer sealing shroud and the piezoelectric actuator are radially stacked and form a radial stack of constant radial thickness.

15. The turbomachine in accordance with claim 13 further comprising a vibration sensor sensing radial vibrations of the rotor blades, the piezoelectric actuators structured and operable to at least one of move and deform the outer sealing shroud radially according to the radial vibrations of the blades which are measured by the vibration sensors.

16. A method for controlling a device for sealing the outer casing of an axial turbomachine, the outer casing including an integrally formed inner groove, and the device comprising a mobile outer shroud defining a radial clearance around an annular row of rotor blades of the turbomachine, the mobile outer shroud exhibiting an upstream circular seal and a downstream circular seal each providing sealing with the integrally formed inner groove, wherein the method comprises:
 determining the altitude of the turbomachine; and
 adjusting the clearance according to the altitude.

17. The method in accordance with claim 16, wherein at least one of the clearance decreases as the altitude increases and the clearance increases as the altitude decreases.

18. The method in accordance with claim 16, wherein the clearance is at least equal to a clearance J1 when the altitude exceeds a threshold altitude A2, and the clearance is greater than or equal to a clearance J2 when the altitude is less than or equal to a threshold altitude A2.

19. The method in accordance with claim 16 further comprising:
 measuring the clearance between the outer shroud and the rotor blades; and
 during the adjusting the clearance, the clearance is additionally adjusted according to the clearance measured during the measuring the clearance.

20. The method in accordance with claim 16 further comprising:
 measuring the amplitude of the radial vibrations of the rotor blades; and
 during the adjusting the clearance, the clearance is also adjusted according to the radial vibrations of the blades as measured during the measuring the amplitude of the vibrations.

* * * * *